United States Patent
Aronsson et al.

(10) Patent No.: US 8,702,561 B2
(45) Date of Patent: Apr. 22, 2014

(54) RETARDING DEVICE FOR A HANDHELD CUTTING MACHINE

(75) Inventors: Tore Aronsson, Mölndal (SE); Bo Carlsson, Alingsäs (SE); Göran Dahlberg, Gränna (SE); Gustaf Döragrip, Jönköping (SE)

(73) Assignee: Husqvarna Aktiebolag, Huskvarna (SE)

( * ) Notice: Subject to any disclaimer, the term of this patent is extended or adjusted under 35 U.S.C. 154(b) by 1082 days.

(21) Appl. No.: 12/528,218

(22) PCT Filed: Feb. 21, 2008

(86) PCT No.: PCT/SE2008/000139
§ 371 (c)(1),
(2), (4) Date: Feb. 4, 2010

(87) PCT Pub. No.: WO2008/103105
PCT Pub. Date: Aug. 28, 2008

(65) Prior Publication Data
US 2010/0140025 A1  Jun. 10, 2010

(30) Foreign Application Priority Data
Feb. 22, 2007 (WO) ................. PCT/SE2007/000156

(51) Int. Cl.
*F16H 61/662* (2006.01)
(52) U.S. Cl.
USPC ................................................. 477/44
(58) Field of Classification Search
USPC ................................ 477/44, 96, 184
See application file for complete search history.

(56) References Cited

U.S. PATENT DOCUMENTS

| 4,528,488 A | 7/1985 | Susemihl |
| 2004/0107771 A1* | 6/2004 | Kawamura et al. .......... 73/118.1 |
| 2008/0146410 A1* | 6/2008 | Inoue et al. ..................... 477/44 |
| 2008/0312033 A1* | 12/2008 | Ohtake et al. ................... 477/94 |

FOREIGN PATENT DOCUMENTS

| DE | 2644353 A1 | 4/1978 |
| WO | 2008103105 A1 | 9/2008 |

OTHER PUBLICATIONS

International Preliminary Report on Patentability for International Application No. PCT/SE2008/000139, dated Aug. 26, 2009.
Written Opinion of the International Searching Authority for International Application No. PCT/SE2008/000139, dated May 12, 2008.

* cited by examiner

*Primary Examiner* — Edwin A Young
(74) *Attorney, Agent, or Firm* — Novak Druce Connolly Bove + Quigg LLP

(57) ABSTRACT

The present invention is related to a retarding device for a hand held cutting machine having a housing (1) and a drive engine, which drives a transmission including a number of transmission members (3', 2) and driving a rotational or semi rotational cutting tool. The retarding device includes brake means (12, 17) arranged to be in close relation with the transmission and for actuating a retarding force on a transmission member (2), the brake means being arranged to automatically put a retarding force on said transmission member when the speed of rotation or the torque of rotation of said transmission member falls below a predetermined value.

23 Claims, 8 Drawing Sheets

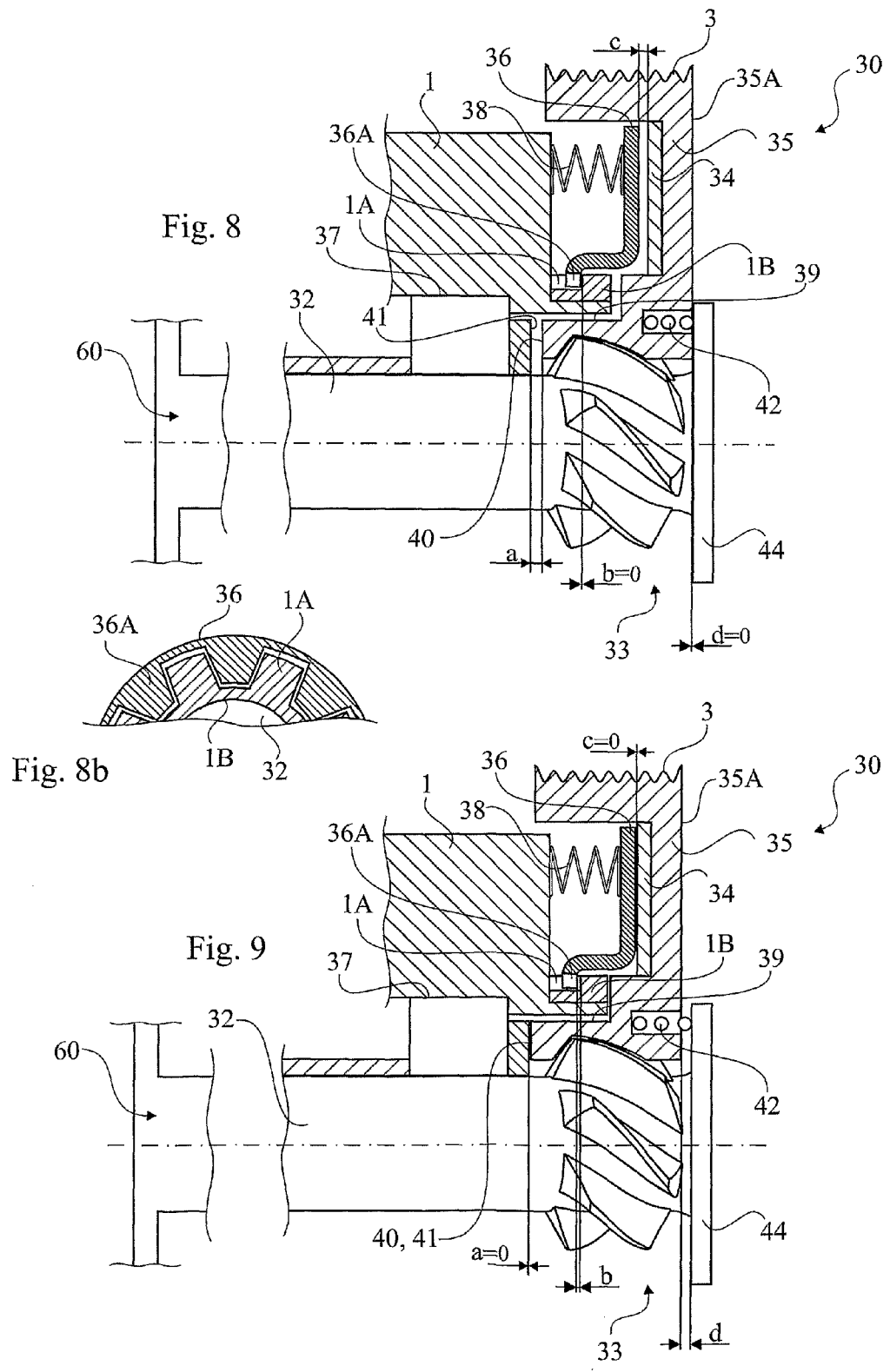

RETARDING DEVICE FOR A HANDHELD CUTTING MACHINE

TECHNICAL FIELD

The present invention is related to a retarding device for a hand held cutting machine having a housing and a drive engine, which drives a transmission which includes a number of transmission members and drives a rotational or semi rotational cutting tool.

BACKGROUND OF THE INVENTION

A hand held cutting machine such as a cut-off saw, chain saw, a clearing saw or the like working at high speeds is often equipped with a safety arrangement on the rear handle laid out such that when the operator releases his grip or removes his hand from the handle the machine throttle returns to idle and the machine slows down towards idle speed. This slow down takes a certain time depending on the speed and rotational energy of the rotating tool as well as of the losses of the transmission between engine and tool and also the braking power of the engine. A cutting machine driven by an internal combustion engine usually has a centrifugal clutch that disengages the engine below an engagement speed. Below this speed there is therefore no braking power from the engine, and thus slowing down of the rotating tool is especially slow, i.e. takes especially long time. Hitherto, a cutting machine has been provided with a driving belt of the kind named V-belt having a considerable energy loss but nowadays such machines are often equipped with a belt which has a considerably smaller thickness and thereby a reduced energy loss, e.g. a poly-v belt. The reduced energy loss however also brings one drawback. The retarding function is much smaller compared to the traditional V-belt. Therefore the slowing down towards idle speed takes even more time. Therefore a separate retarding device could be an advantage. There are mainly two ways to retard, namely by means of manually controlled retarding devices which are actuated by the user or by means of automatically controlled retarding devices which are actuated by a retarding unit when the grip of the rear handle is released. The provision of such a mechanism makes the machine less secure in the case of a manually controlled retarding device and very complicated as to its design in the case of an automatically controlled retarding device. A cut off saw must be regarded as a hand held cutting machine even if it can be attached to a trolley. Its main use is a hand held machine.

OBJECT OF THE INVENTION

The object of the invention is to provide a retarding device for a rotational cutting machine, which device to a large degree overcomes the drawbacks of the known retarding devices.

Another object of the invention is to provide a retarding device for a rotational cutting machine which is reliable.

Two main preferred embodiments of the retarding device according to the invention take use of a retarding action either when a predetermined value of the speed is reached or when a predetermined value of a torque of rotation, i.e. predetermined braking torque, is reached, respectively. Thereby the retarding function is actuated and will slow down and stop the rotation of the cutting tool.

SUMMARY OF THE INVENTION

The above objects are achieved by means of a retarding device for a rotational cutting machine having a housing and a drive engine, which drives a transmission which includes a number of transmission members and drives a rotational or semi rotational cutting tool.

BRIEF DESCRIPTION OF THE DRAWINGS

The invention will now be described in closer detail in the following by way of preferred embodiments thereof with reference to the annexed drawings.

FIG. 8 is a side view partially in cross-section of a second embodiment of a retarding device according to the invention.

FIG. 8b is a cross sectional view of the area with splines on the central shaft in FIG. 8.

FIG. 9 is a view similar to FIG. 8 of the retarding device in another position.

DESCRIPTION OF PREFERRED EMBODIMENTS

Figure 1:
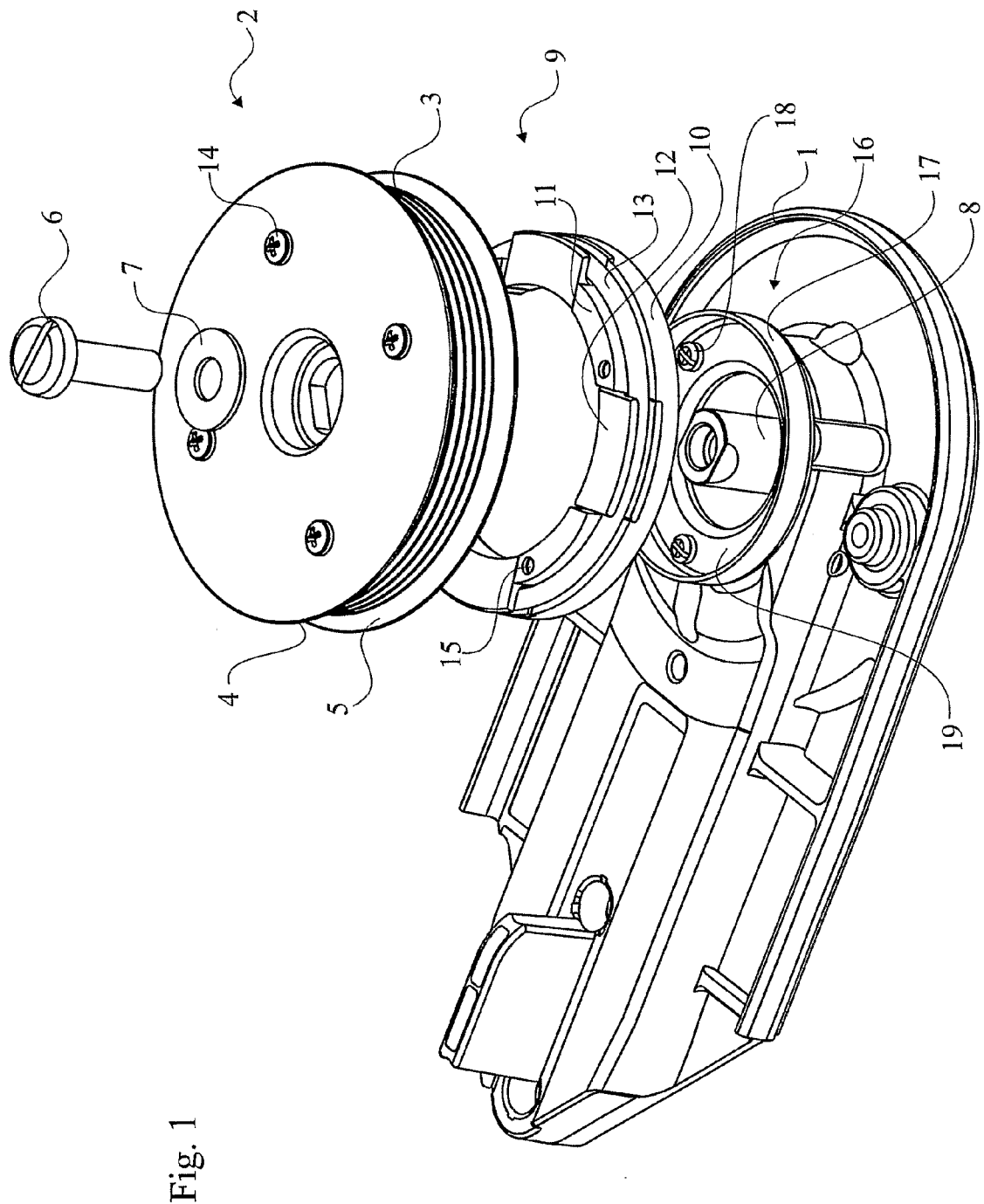
FIG. 1 is a perspective split view of first embodiment of a retarding device according to the invention where several parts of the cutting machine are deleted for clarity.
Figure 2:
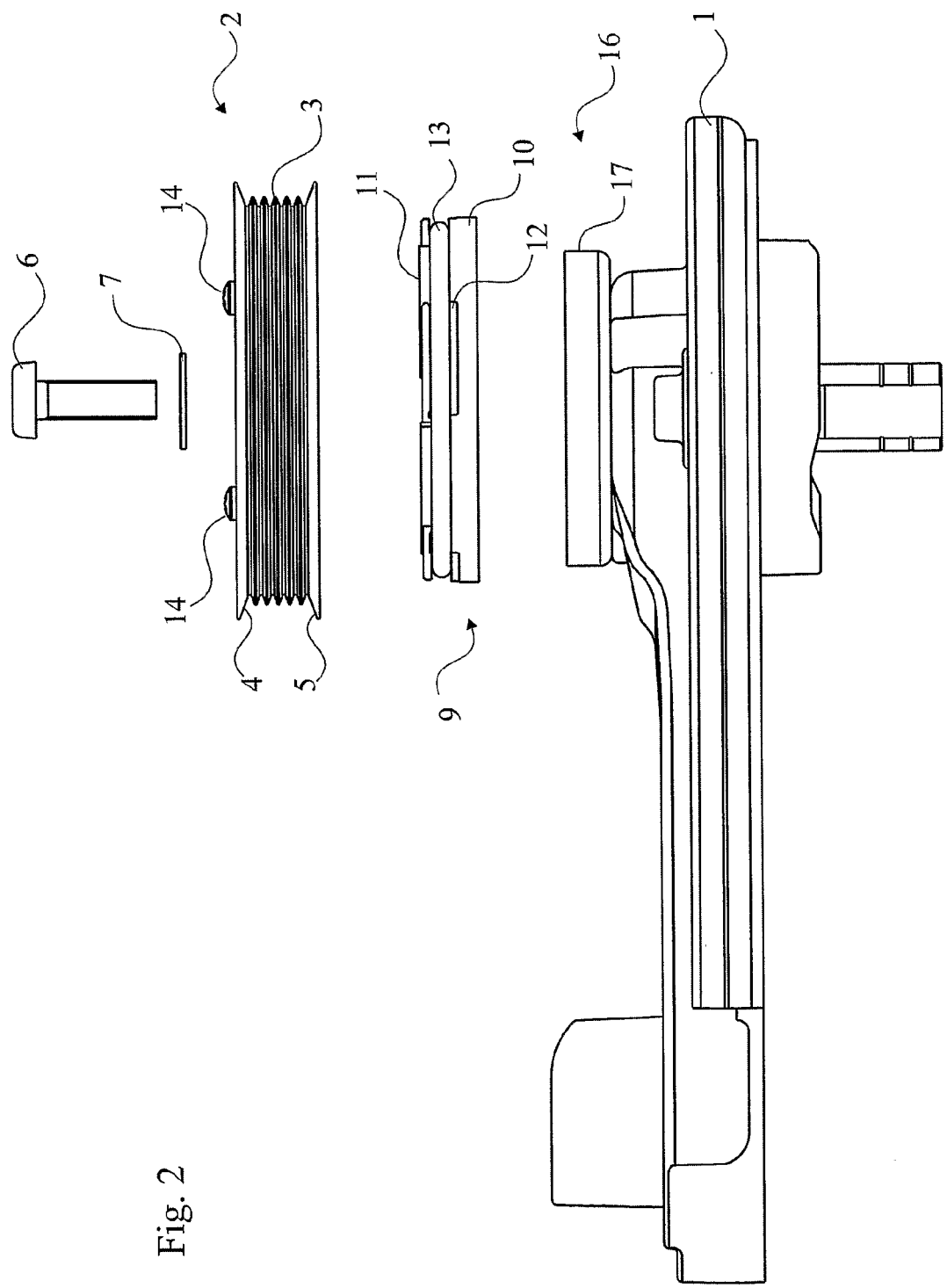
FIG. 2 is a side split view of the retarding device in FIG. 1.
Figure 3:
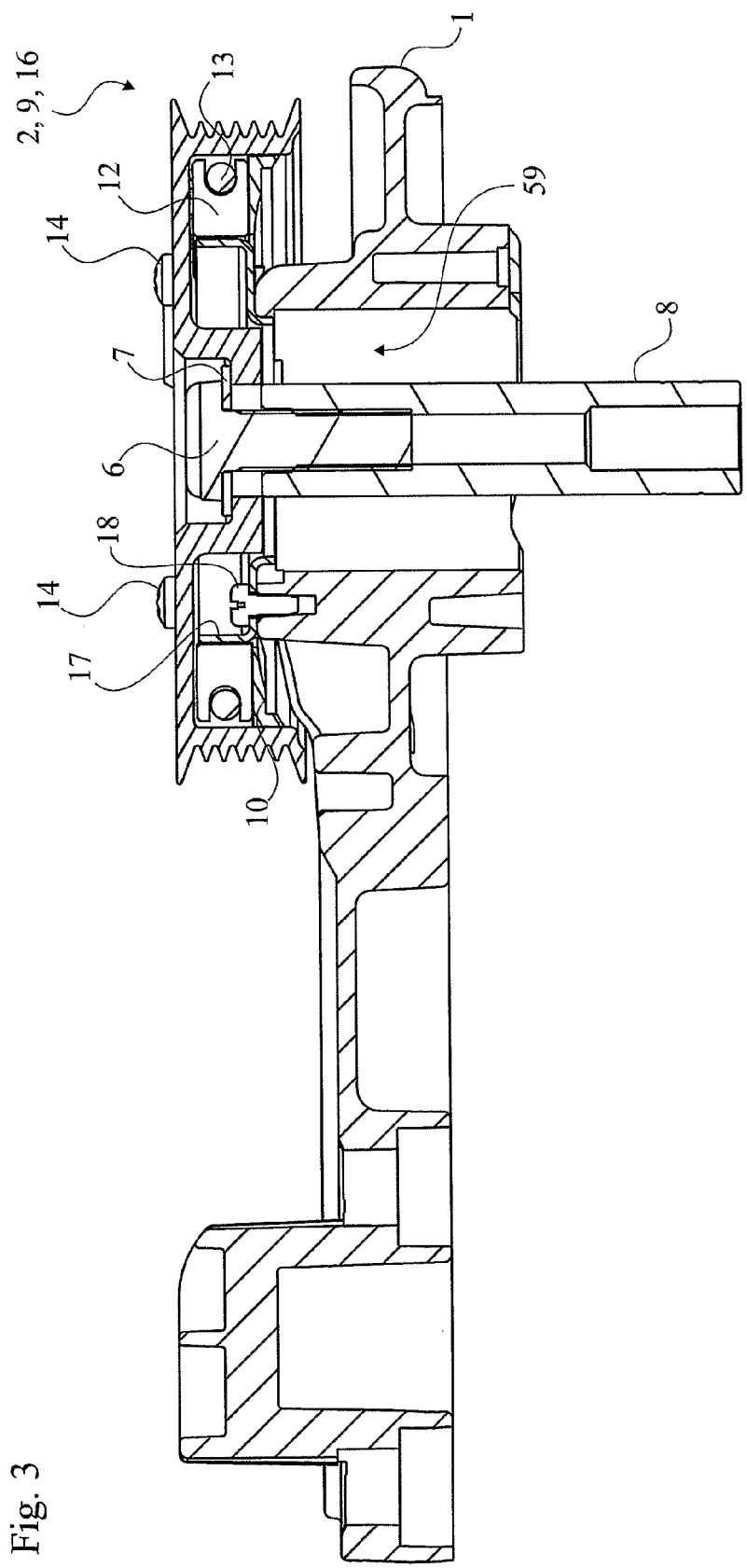
FIG. 3 is a cross-sectional along the retarding device in FIG. 1.

In the description and drawings, similar items in the showed embodiments are denoted with the same reference numeral.

In FIGS. 1-6 a first embodiment of a retarding device according to the invention is shown. The retarding device is a part of a rotational cutting machine as a cut-off saw, which comprises a housing 1 (only a part thereof is shown) and a second belt pulley 2 rotatably mounted in the housing 1. The housing is part of a cutter arm fastened to the drive unit. All these stationary parts are collectively called housing 1. The second belt pulley 2 has a belt supporting surface 3 between two flanges 4 and 5 and is fastened by means of a bolt 6 and a washer 7 at a driven shaft 8, which on the other side of the housing 1 carries a tool (not shown) as the cutting tool of the cut-off saw. A drive engine powers a transmission that rotates the tool. This transmission comprises a first belt pulley 3', a belt (not shown), the second belt pulley 2, which drives the driven shaft 32, compare FIG. 10.

Figure 4:
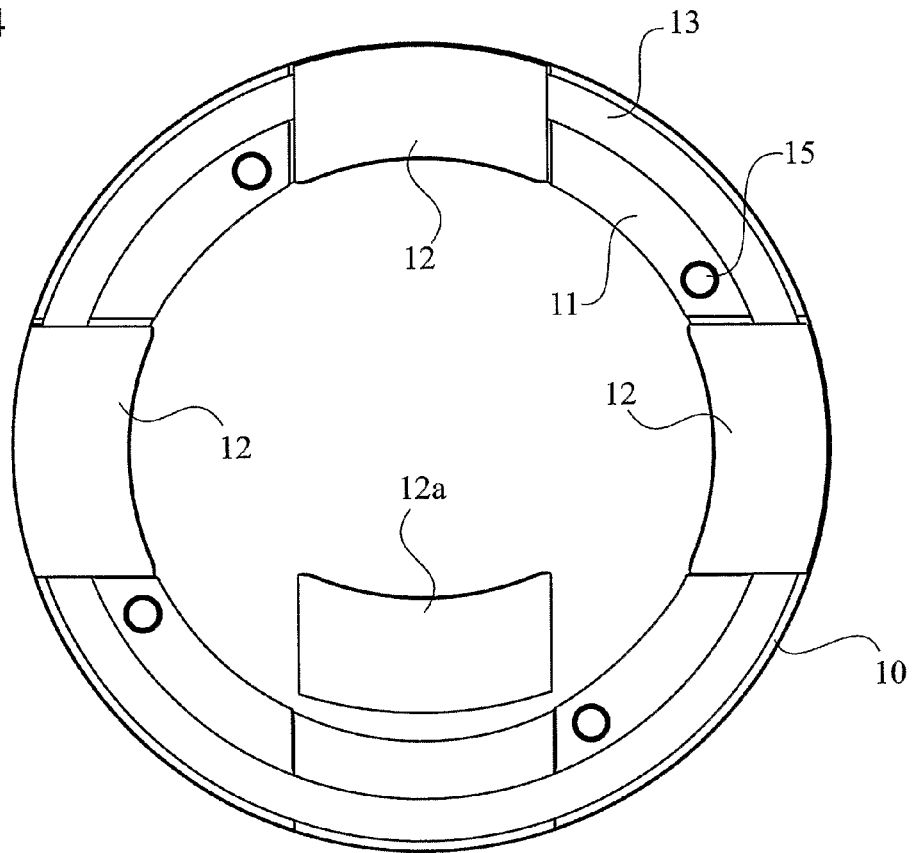
FIG. 4 is a side view of a ring with retarding shoes.
Figure 5:
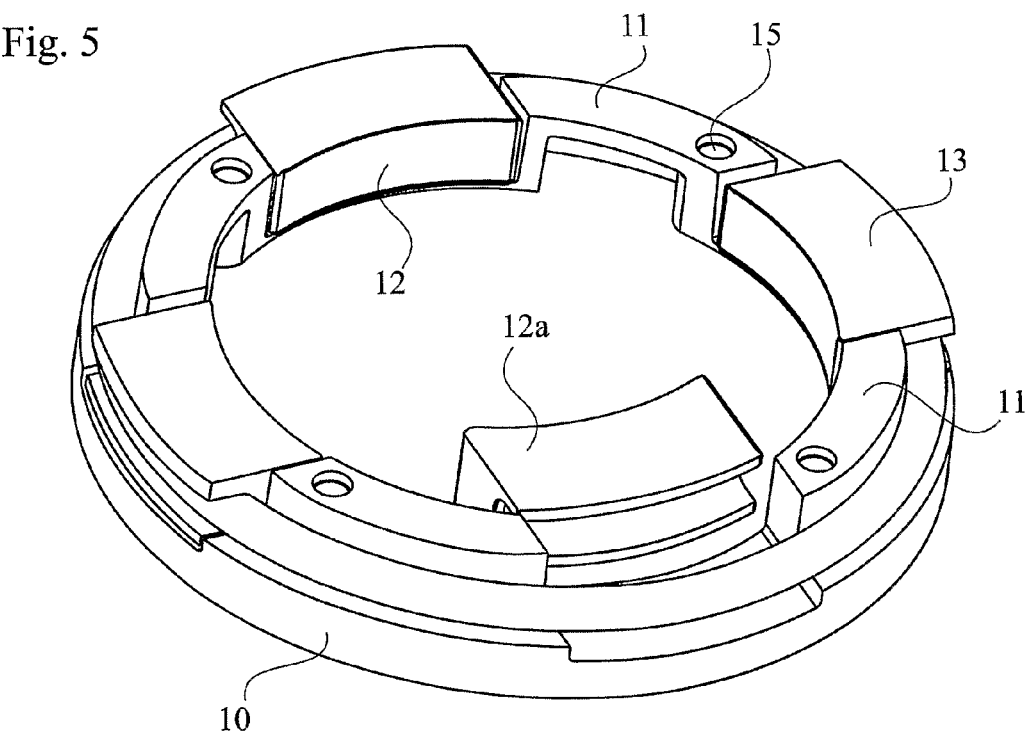
FIG. 5 is a perspective view of the ring in FIG. 1.
Figure 6:
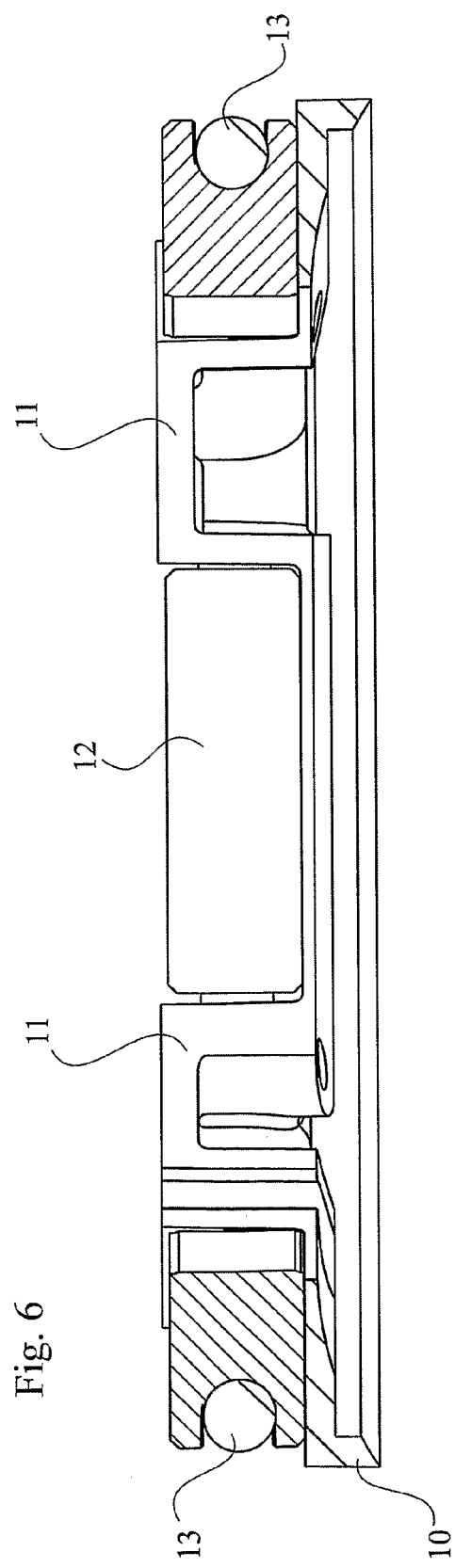
FIG. 6 is a side view partially in cross-section of the ring holding the brake shoes and the elastic means.

A brake shoe holder 9 comprises a plane ring 10 with a selected number of integral spacing blocks 11 fixed thereto on predetermined distances from each other along the circumference of the ring 10, brake shoes 12 having a substantially U-formed cross-section, and a circular spring 13 situated in the grooves of the U-formed brake shoes. The spring 13 can consist of an endless ring of an elastic material or it can consist of an endless ring of a metal wound spring. The open side of each brake shoe is faced to the outer periphery of the ring 10. In FIGS. 4 and 5 the configuration of a brake shoe 12a is better illustrated before insertion in the ring 10. The brake shoe holder 9 is fixed connected to the belt pulley 2 by means of screws 14 which are fixed in threaded holes 15 in the spacing blocks 11. In the preferred embodiment in FIGS. 1-6, four spacing blocks 11 and four brake shoes 12 are shown. However, this number can be varied.

A brake drum 16 having an axially extending flange 17 is fastened at the housing 1 by means of screws 18 which are introduced in holes (not shown) on a radially extending portion 19 of the brake drum 16.

The function of the retarding device according to the invention is as follows:

When the rotational cutting machine is started, the machine quickly reaches a high number of revolutions, i.e., over 3000 rpm, and due to centrifugal forces the brake shoes 12 are brought radially outwards against the bias of the elastic circular spring 13. When the machine is stopped either on purpose when ending a working operation or unintentionally when the operator releases his grip of the rear handle, the elastic circular spring 13 urges the four brake shoes 12 against the circular flange 17 of the brake drum 16 when the machine loses speed and the speed of rotation of the tool driving shaft 8 fixedly connected to the belt pulley 2 and the brake shoe holder 9 falls below a predetermined number of revolutions (rpm). The selected rpm for actuating the retarding device according to the invention is dependent on the resilience of the elastic circular spring 13, i.e. a spring force, which is arranged to urge against the brake shoes 12. The centrifugal force acting on the brake shoes depends on their weight and their speed of rotation. At a determined lower speed the spring force is bigger than the centrifugal force and urges each brake shoe inwards in contact with the brake drum.

Figure 7:
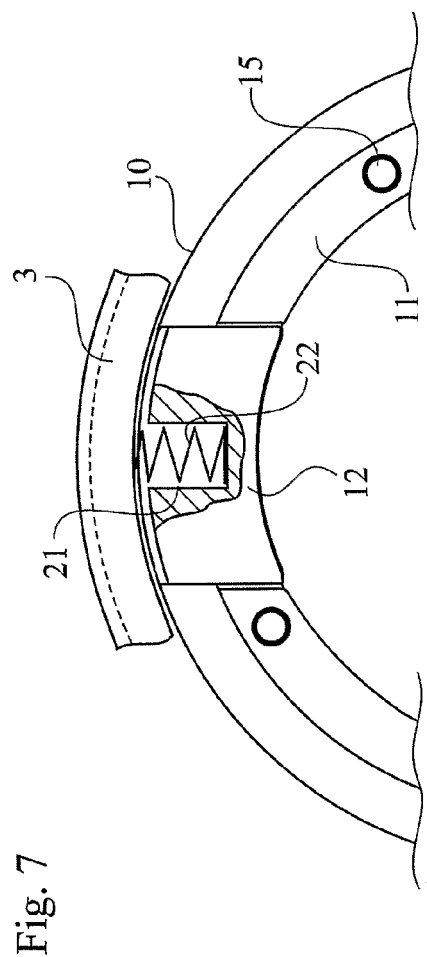
FIG. 7 is a side view of another design of a brake shoe of a retarding device according to the invention.

In FIG. 7, a detail of another embodiment of the retarding device according to the invention is shown, namely a brake shoe 20 which has an overall form substantially identical with the brake shoe 12 of the preferred embodiment according to FIGS. 1-6. The brake shoe 20 has, instead of a groove engaging the elastic circular spring 13, a recess 21, whereby one end of a pressing spring 22 is introduced and possibly secured therein. The characteristic of the spring shall be chosen so that it depends on the weight of the brake shoe, i.e. a light brake shoe could be provided with a spring with low spring force. The characteristic of the spring and its resulting spring force should be selected to match the weight of the brake shoe and the resulting centrifugal force, as described. The other end of the pressing spring 22 abuts or is fastened at the inner surface 23 of the belt pulley 2. The recess 21 has also the purpose of receiving the spring 22 when it is compressed during utilization of the machine. In some embodiments a retarding device could be designed wherein a pulling spring is introduced and secured in a recess (not shown) on the opposite inner side of the brake shoe. However, such a retarding device is more complicated as to the support of the other end of the spring.

In FIGS. 8, 8b and 9 yet another embodiment of a retarding device 30 according to the invention is shown. This retarding device is also a part of a rotational cutting machine also called a cut-off saw. If the invention is instead used for a clearing saw there is no belt transmission but instead at least a drive shaft from the engine. Possibly the transmission could also be a chain or gear wheel transmission. In this embodiment a second belt pulley 3, which is rotated anti clockwise as seen from the right end of the machine in FIG. 8, is connected to a driven shaft 32 of the machine by means of a helical gear 33, the toothed wheel thereof having teeth that are not axially directed. Instead they are directed with an angle in relation to axial so that when the engine and transmission starts to brake the rotation of the tool and this brake torque reaches a predetermined value a friction disc 34 fixed to the radially extending flange 35 of the belt pulley 3 is automatically moving axially together with the pulley 3 towards a brake disc 36 and brought into contact therewith. A central portion of the brake disc 36 is displaced away from the rest of the friction disc 34 and is connected to the housing 1 of the machine by means of a splined connection with projections 36A on the brake disc 36 and corresponding projections 1A on a circumferentially extending protrusion 1B of the housing 1 of the machine (see FIG. 8b). A bearing 37 is provided between the housing 1 and the driven shaft 32, which has an opposite left end 60 to which the rotational tool is fastened. A spring member 42 can be provided in the gap defined by the outer surface 35A of the flange 35 of the pulley 31 and a radially extending flange 44 of the driving shaft 32. The spring member 42 has a low spring coefficient and is provided to facilitate to start moving the pulley 3 in order to initiate retardation thereof. The spring 42 is primarily used to start up the movement of the friction disc 34 towards the brake disc 36 when the rotation of the machine is going to be retarded. A spring assembly 38 with low spring characteristics facilitate urging the brake disc 36 with an even force against the friction disc 34. The number of springs of the spring assembly 38 along the circumference of the driving shaft 32 could be three or more. In an exceptional case only two springs could be provided. Possibly the spring assembly 38 could even consist of a single spring centered around the shaft 32, e.g. a leaf spring or a helical spring. The belt pulley 3 has an axially extending flange 39 which is situated near the centre thereof and which has a stop end 40 provided to abut a limit stop 41 on the housing 1 of the machine to limit the movement between the contact surfaces of the friction disc 34 and the brake disc 36. The movement of the belt pulley 3 is accordingly limited to the distance "a" defining the gap between the stops 40 and 41 in the position shown in FIG. 8, when the machine is prepared to be activated over said predetermined rotation torque. The distances "b", "c" and "d" in FIGS. 8 and 9 are indicated to show how the parts of the machine are moved from the position shown in FIG. 8 to the extreme position in FIG. 9. The distance "a" becomes zero when the stops 40 and 41 comes to contact with each other and the brake disc 36 moves the distance "b" when the retarding device is actuated. The outer side of the belt pulley 3 abuts against a radially extending flange 44 provided at the end of the driving shaft 32, When the retarding device is actuated, the belt pulley 3 is moved the distance "d" when the stops 40 and 41 comes to contact with each other at the end of the axial movement of the pulley 3. In FIG. 8, the retarding device 30 of the machine is shown when the engine is driving the tool, and, in FIG. 9, the brake device 30 of the machine is shown when instead the tool is braked by the engine and its transmission, i.e. the brake torque has reached a predetermined value. It must be observed that the pulley 3 could instead be rotated in the opposite direction, i.e. a clockwise direction. In this case there must be an opposite spiralling direction of the teeth on shaft 32.

Figure 10:
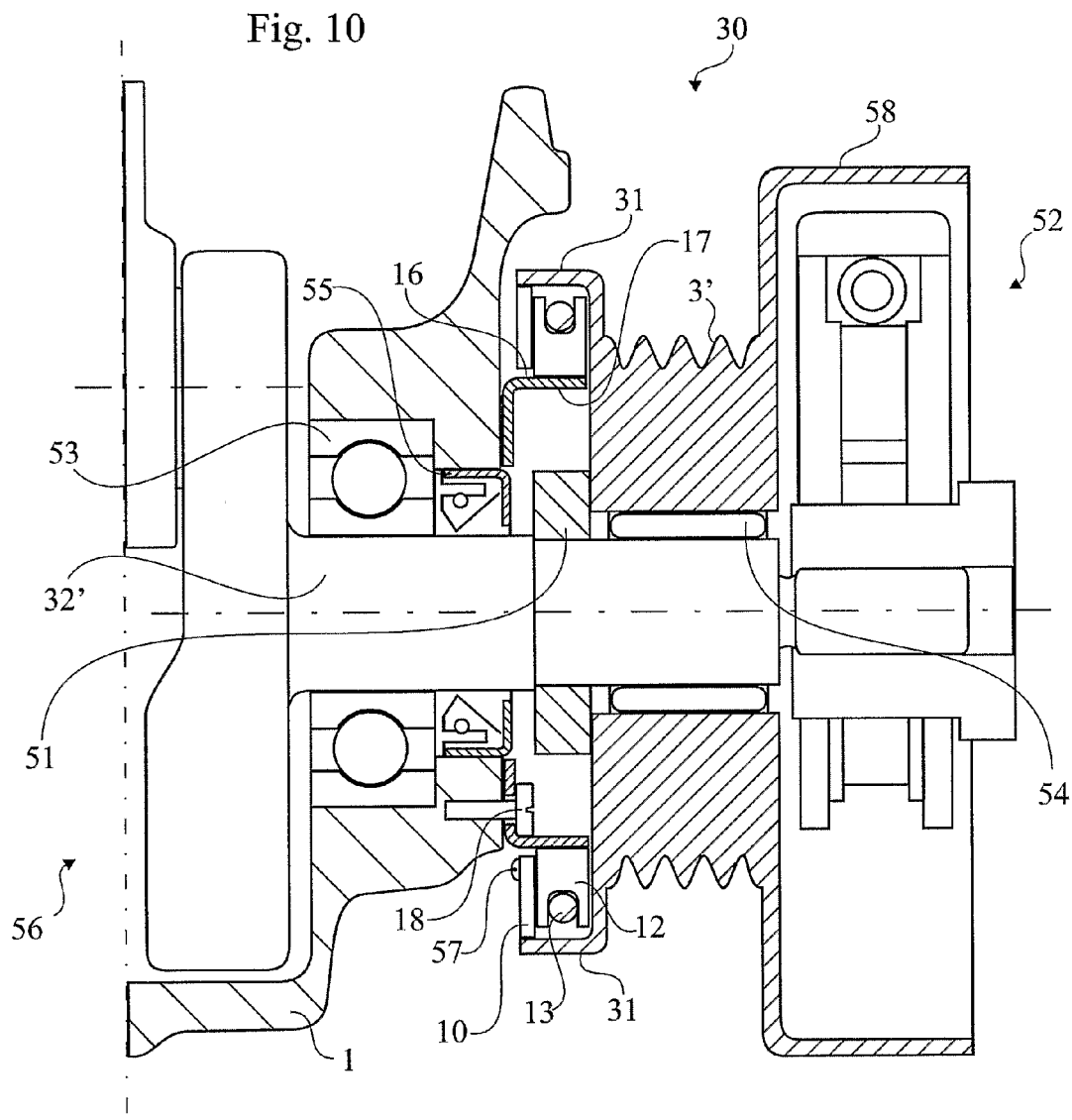
FIG. 10 is a side view partially in cross-section of a third embodiment of a retarding device according to the invention.

FIG. 10 shows another embodiment of the retarding device 30 according to the invention. This retarding device is also a part of a rotational cutting machine as a cut-off saw. A first belt pulley 3' is journalled on a bearing 54 on a driving shaft 32' or crank shaft 32' and has an outer portion 58 which partly encloses a centrifugal clutch 52. A brake drum 16 which is fastened by means of screws 18 to the housing 1 has a radially extending friction flange 17. As in the first embodiment of the retarding device according to FIGS. 1-6, the closed side of the U-formed brake shoes 12 are arranged to come into contact with the flange 17 situated on the radially inner side of the machine. In the space between each brake shoe, spacing blocks (not shown) are placed and secured by means of screws 57 which extends through holes (not shown) in a plane ring 10 at the housing 1. A circular spring 13 is situated in the grooves of the U-formed brake shoes 12. The driving shaft 32', i.e. a part of the crank shaft, is journalled by means of a bearing 53 in the housing 1. At the end opposite the centrifugal clutch 52 a crank shaft assembly 56 is provided. It is part of an internal combustion engine with centrifugal clutch 52 that forms a drive engine for the cut-off saw. An electric engine without centrifugal clutch is another possible drive engine. An axially extending flange 31 of the first belt pulley 3' is arranged on the outside of the brake shoes 12 and encloses the same together with the plane ring 10. An axial distance block 51 is provided on the shaft 32 to limit the axial movement of the belt pulley 3. A sealing ring assembly 55 is provided around the shaft 32 between the distance block 51 and the bearing 53.

Figure 11:
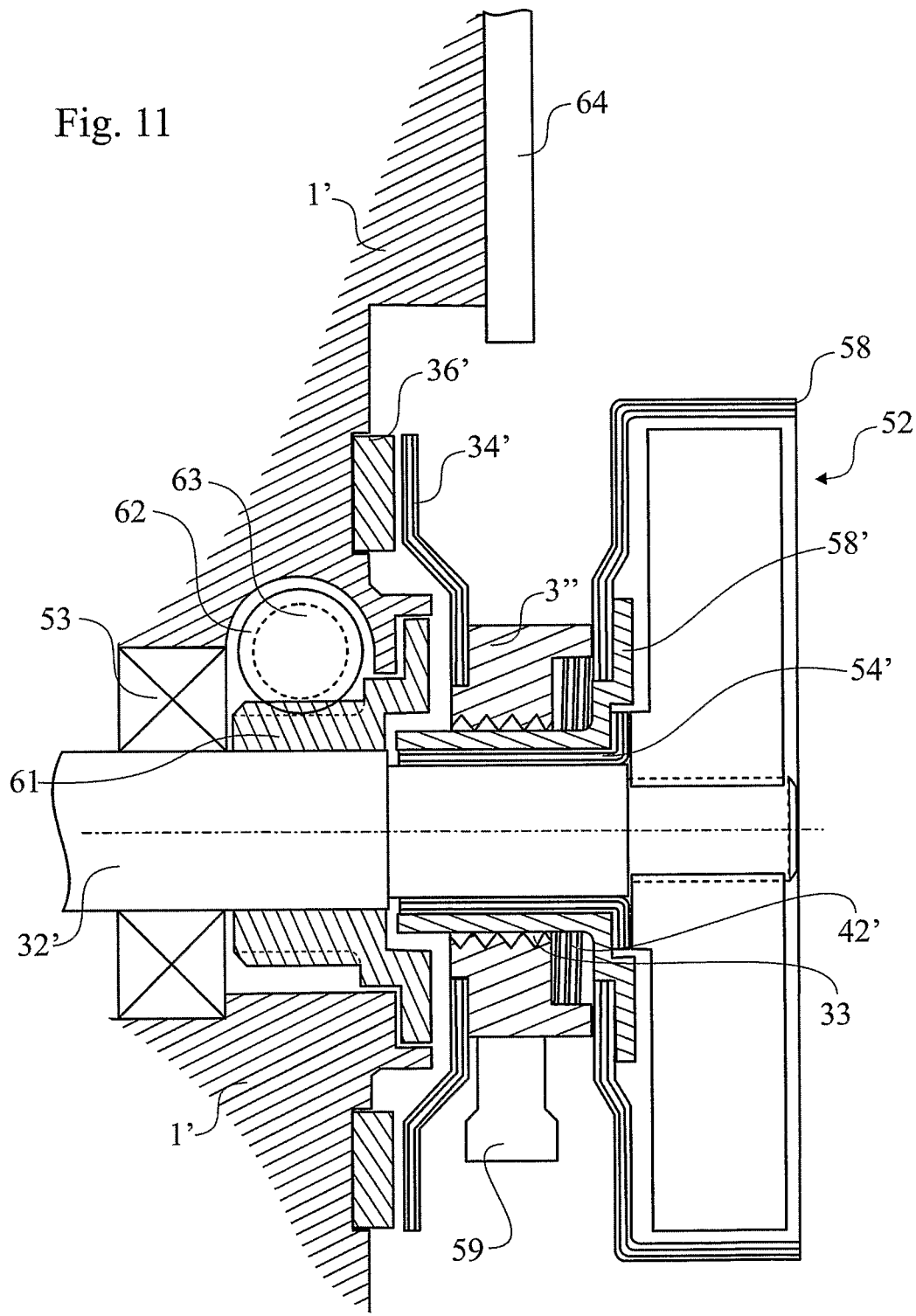
FIG. 11 is a side view partially in cross-section of a fourth embodiment of a retarding device according to the invention.

FIG. 11 shows yet another embodiment of the retarding device according to the invention. This embodiment concerns a chainsaw having a saw bar 64 attached to a housing 1' of the saw. At the end of the saw bar the chain rounds a second chain pulley, not shown in the figure-a fully conventional arrangement. Further a crank shaft or driving shaft 32' is journalled in at least two main bearings, only one 53 is shown in FIG. 11. An outer end of the crankshaft carries a centre part of the centrifugal clutch 52. Its outer part 58 has a centre part 58' journalled around the crankshaft via a radial and axial bearing 54'. Therefore the outer part 58 is freely rotatable around the crankshaft, but is engaged by the centre part of the centrifugal clutch when the crankshaft reaches a certain speed. A first chain pulley 3" drives a chain 59 which is supported by the saw bar 64. There is also a pump gear 61 attached to the crankshaft 32'. In a transverse direction to the pump gear there is an co-operating gear 62 driving the pump 63 for chain lubrication.

All this is conventional and is therefore not discussed further. However, the first chain pulley 3" is supplied with a brake member 34' which is fixed to the first chain pulley. A helical gear assembly 33 or an angled splines assembly is provided between the centre part 58' and the first chain pulley 3". A friction member 36' is rotationally fixed relative to the housing 1' and the brake member 34' is arranged to act against said friction member when the first chain pulley 3" moves in an axial direction towards the friction member. Preferably the friction member 36' is axially fixed relative to the housing. However, it could also be axially suspended by at least one spring as shown in the embodiment according to FIG. 8-9, this embodiment also describes how the belt or chain pulley moves axially when the engine brakes the tool. Preferably the brake member 34' has a shape of a ring with its inner part fastened to the first chain pulley. Preferably the ring-shape of the brake member has an axial offset of its outer part away from the first chain pulley.

The first chain pulley 3" and the chain 59 and a second chain pulley can be described as a chain transmission having a first chain pulley 3" arranged close to, and being driven by the drive engine, and a second chain pulley being driven by the chain 59, such that the transmission drives the chain and said brake means being arranged to put a brake force on the first chain pulley and therefore brake the chain. In this case the second chain pulley does not drive a rotational tool. Instead the chain itself is arranged as a cutting tool. A separate link of the chain moves in a semi rotational pattern as it first moves straight then rotates around the second chain pulley then straight and then around the first chain pulley etc. FIG. 11 shows a retarding device for a chain saw. Obviously the same retarding device can be used for a cut-off saw if the first chain pulley 3" is substituted with a belt pulley 3'. In the same way the retarding device of a cut-off saw in FIG. 10 could be used for a chain saw.

So far only retarding devices acting on a first or a second belt pulley of a belt transmission have been described. However these retarding devices can also be arranged as part of another transmission. In a brush cutter or clearing saw the drive engine instead drives a driven shaft which drives a rotational tool either directly or through a gear reduction. Therefore there would be no first belt pulley 3', and the flange 20 would be connected directly to the inner or left side of the outer portion 58, which is driven by the engine at speeds above the engagement speed of the centrifugal clutch 52. To the outer or right side of clutch 52 a drive shaft is connected to the outer portion 58. If there is no centrifugal clutch, e.g. in an electric drive engine, the flange 20 would instead be connected directly to the drive shaft or to the driven shaft, as there could be an elastic coupling and/or a reduction gear following the drive engine. The retarding device could also be connected in an outer end of the driven shaft close to the rotational cutting tool and be fastened to a stationery housing part.

It should be noted that the retarding device according to the invention is not limited to the above described embodiments, but could be modified within the scope of the appended claims.

The invention claimed is:

1. A retarding device for a hand held cutting machine having a housing and a drive engine, which drives a transmission comprising a number of transmission members and drives a rotational or semi rotational cutting tool, said retarding device comprising a brake means arranged to be in close relation with the transmission and for actuating a retarding force on a transmission member, said brake means being arranged to automatically put a retarding force on said transmission member when the speed of rotation or the torque of rotation of said transmission member falls below a predetermined value.

2. Retarding device according to claim 1, wherein the drive engine is an internal combustion engine with a centrifugal clutch, which drives the transmission.

3. Retarding device according to claim 1, wherein the drive engine is an electric engine.

4. Retarding device according to claim 1, wherein said transmission drives a rotational cutting tool.

5. Retarding device according to claim 1, wherein the transmission is a belt transmission having a first belt pulley arranged close to and being driven by the drive engine and a second belt pulley being driven by a belt driven by the first belt pulley and said brake means being arranged to put a brake force either on the second or on the first belt pulley.

6. Retarding device according to claim 5, wherein said brake means comprises a friction member which is rotationally fixed relative to said housing and a brake member fixed to either of said pulleys and arranged to act against said friction member.

7. Retarding device according to claim 6, wherein the transmission is a belt transmission having a first belt pulley arranged close to and being driven by the drive engine and a second belt pulley being driven by a belt driven by the first belt pulley and said brake means being arranged to put a brake force on the first belt pulley, and said brake means comprises a friction disc fixed to a radially extending flange of said first belt pulley, and a brake disc having the form of a ring which is axially movable and on which a spring is arranged to urge when the brake force is actuated between said friction disc and said brake disc.

8. Retarding device according to claim 6, wherein the transmission is a belt transmission having a first belt pulley arranged close to and being driven by the drive engine and a second belt pulley being driven by a belt driven by the first belt pulley and said brake means being arranged to put a brake force on the first belt pulley, and said first belt pulley is connected to a shaft, of the transmission, by means of a helical gear assembly or angled splines which provides that the first belt pulley can be automatically movable in the axial direction of the shaft when a retarding action is applied on said shaft.

9. Cut-off saw including a retarding device according to claim 5.

10. Retarding device according to claim 1, wherein the transmission is a chain transmission having a first chain pulley arranged close to and being driven by the drive engine and a second chain pulley being driven by a chain driven by the first chain pulley such that the transmission drives the chain and said brake means being arranged to put a brake force on the first chain pulley and thereby brake the chain.

11. Retarding device according to claim 10, wherein the chain is a saw chain in a chain saw.

12. Retarding device according to claim 10, wherein said brake means comprises a friction member which is rotationally fixed relative to said housing and a brake member fixed to said first chain pulley and arranged to act against said friction member.

13. Retarding device according to claim 12, wherein said friction member is axially fixed relative to said housing and the brake member has the shape of a ring.

14. Chain saw including a retarding device according to claim 10.

15. Retarding device according to claim 1, wherein the transmission has a drive shaft driven by the drive engine, which drive shaft drives a rotational cutting tool either directly or indirectly through a gear reduction.

16. Brush cutter or clearing saw including a retarding device according to claim 15.

17. Retarding device according to claim 1, wherein said brake means comprises a brake drum having an axially extending flange fixed to said housing and at least one brake shoe which is arranged to act against said axially extending flange.

18. Retarding device according to claim 17, wherein the transmission is a belt transmission having a first belt pulley arranged close to and being driven by the drive engine and a second belt pulley being driven by a belt driven by the first belt pulley and said brake means being arranged to put a brake force on the second belt pulley, and said brake means comprises elastic means urging on said at least one brake shoe so that when the speed of rotation of said second belt pulley falls below said predetermined value the elastic means is arranged to press the brake shoe so that the brake shoe moves inwards and comes into contact with a radially outer surface of said radially extending flange.

19. Retarding device according to claim 18, wherein said elastic means comprises a circular spring member arranged to urge against said at least one brake shoe.

20. Retarding device according to claim 19, wherein said circular spring member is a circular helically wounded spring member arranged to urge against said at least one brake shoe.

21. Retarding device according to claim 19, wherein said circular spring member is a circular elastic band arranged to urge against said at least one brake shoe.

22. Retarding device according to claim 18, wherein said elastic means comprises at least one pressing spring arranged to urge against said at least one brake shoe.

23. Retarding device according to claim 18, wherein said elastic means comprises at least one pulling spring arranged to urge against said at least one brake shoe.

* * * * *